United States Patent [19]
Gebler et al.

[11] Patent Number: 5,844,607
[45] Date of Patent: Dec. 1, 1998

[54] METHOD AND APPARATUS FOR SCENE CHANGE DETECTION IN DIGITAL VIDEO COMPRESSION

[75] Inventors: Charlene Ann Gebler, Vestal; Barbara Ann Hall; Agnes Yee Ngai, both of Endwell, all of N.Y.

[73] Assignee: International Business Machines Corporation, Armonk, N.Y.

[21] Appl. No.: 626,879

[22] Filed: Apr. 3, 1996

[51] Int. Cl.⁶ .............................. H04N 7/12; H04N 11/02; H04N 11/04
[52] U.S. Cl. .................. 348/390; 348/420; 348/405; 348/422; 348/700; 348/408
[58] Field of Search ..................... 348/405, 408, 348/420, 700

[56] References Cited

U.S. PATENT DOCUMENTS

| | | | |
|---|---|---|---|
| 5,099,322 | 3/1992 | Gove | 358/105 |
| 5,144,424 | 9/1992 | Savatier | 358/133 |
| 5,231,484 | 7/1993 | Gonzales et al. | |
| 5,283,646 | 2/1994 | Bruder | 348/415 |
| 5,294,974 | 3/1994 | Naimpally et al. | 348/395 |
| 5,301,242 | 4/1994 | Gonzales et al. | 382/56 |
| 5,398,078 | 3/1995 | Masuda et al. | 348/699 |
| 5,404,174 | 4/1995 | Sugahara | 348/700 |
| 5,440,344 | 8/1995 | Asamura et al. | 348/405 |
| 5,457,495 | 10/1995 | Hartung | 348/414 |
| 5,459,517 | 10/1995 | Kunitake et al. | 348/416 |
| 5,477,278 | 12/1995 | Kitaura et al. | 348/699 |

*Primary Examiner*—Tommy P. Chin
*Assistant Examiner*—Nhon T. Diep
*Attorney, Agent, or Firm*—Richard M. Goldman

[57] ABSTRACT

A method of encoding a picture in an MPEG2 compliant digital video encoder. The method calculates a contrast function, $$\text{Contrast} = \Sigma |P(j) - P(j+1)|$$

and thereafter calculates a quantization adjustment function therefrom $$M(i+1) = [C(i+1)/C(i)]M(i),$$

where C=Contrast, P(j) is the luminance or chrominance of the $j^{th}$ pixel, and M(i) is the average quantization of the $i^{th}$ picture. The quantization or picture type is adjusted in response to the contrast function, C.

3 Claims, 4 Drawing Sheets

METHOD AND APPARATUS FOR SCENE CHANGE DETECTION IN DIGITAL VIDEO COMPRESSION

FIELD OF THE INVENTION

The invention relates to compression of digital visual images, and more particularly to temporal compression, that is the compression of redundancy between pictures. Redundancy between pictures is reduced, or even eliminated, through the use of motion vectors. In compression under the MPEG2 Standard the macroblock data and vector data are quantized. When using quantized data, picture uniformity is a function of quantization uniformity. That is, the requirement to provide uniformity in a picture means that the quantization must vary smoothly from macroblock to macroblock. According to the invention the quantization is adjusted to maintain a high degree of quantization uniformity.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and videoconferencing to subscribers, an enormous amount of network bandwidth is required. In fact, network bandwidth is often the main inhibitor to the effectiveness of such systems.

In order to overcome the constraints imposed by networks, compression systems have emerged. These systems reduce the amount of video and audio data which must be transmitted by removing redundancy from individual pictures and from the picture sequence. At the receiving end, the picture sequence is decompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, followed by quantization, variable length coding, and Huffman coding. Video compression between pictures is accomplished via a process referred to as motion estimation, in which a motion vector is used to describe the translation of a set of picture elements (pels) from one picture to another.

The amount of bits needed to represent any one picture is directly related to the content and the complexity of the individual picture. Thus, each picture may have a different number of bits. However, effective transmission bandwidth utilization requires a relatively constant bit rate. The process of rate control is used to regulate and maintain approximately constant bit rate to the decoder. There are three main functions for bit rate control:
(1) Picture bit allocation.
(2) Macroblock rate control.
(3) Macroblock adaptive quantization.

Picture bit allocation depends on picture complexity, the requirement to maintain a relatively constant bit rate, and the requirement to observe rate control buffer limits. Macroblock rate control regulates the produced bits to match allocations. Macroblock adaptive quantization produces uniformly noticeable distortion.

The requirement to produce uniformity in a picture means that the quantization varies smoothly from macroblock to macroblock. In a sequence of pictures within a single view, the pictures change only slightly from one picture to the next picture. However, when there is a change in picture content the quantization can and will vary sharply. Thus, a need exists for scene change detection to determine if two adjacent pictures are of similarity or are of large difference.

OBJECTS OF THE INVENTION

It is a primary object of the invention to provide scene change detection to determine if two adjacent pictures have similarity or have large differences.

SUMMARY OF THE INVENTION

These and other objects of the invention are achieved by the method of encoding the digital video datastream. The method first calculates a contrast function, $$C = \Sigma |P(j) - P(j+1)|$$

where C is the Contrast, and P(j) is the luminance or chrominance of the $j^{th}$ pixel, and thereafter calculates a quantization adjustment function therefrom, $$M(i+1) = [C(i+1)/C(i)]M(i),$$

where M(i) is the average quantization of the $i^{th}$ picture. The quantization is adjusted in response to the contrast function, C.

THE FIGURES

The invention may be more clearly understood by reference to the Figures appended hereto.

FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, the picture output 121, the feedback picture for motion estimation and compensation 131, and the motion compensated picture 101. This FIGURE has the assumptions that the $i^{th}$ pictures exists in Frame Memory or Frame Store 42, and that the i+$1^{th}$ picture is being encoded with motion estimation.

DETAILED DESCRIPTION OF THE INVENTION

The invention relates to MPEG and HDTV compliant encoders and encoding processes. The encoding functions performed by the encoder include data input, motion estimation, macroblock mode generation, data reconstruction, entropy coding, and data output. Motion estimation and compensation are the temporal compression functions. They are repetitive functions with high computational requirements, and they include intensive reconstructive processing, such as inverse discrete cosine transformation, inverse quantization, and motion compensation.

More particularly the invention relates to motion estimation, compensation, and prediction, and even more particularly quantization during motion estimation, compensation, and prediction. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory bandwidth, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

Figure 1:
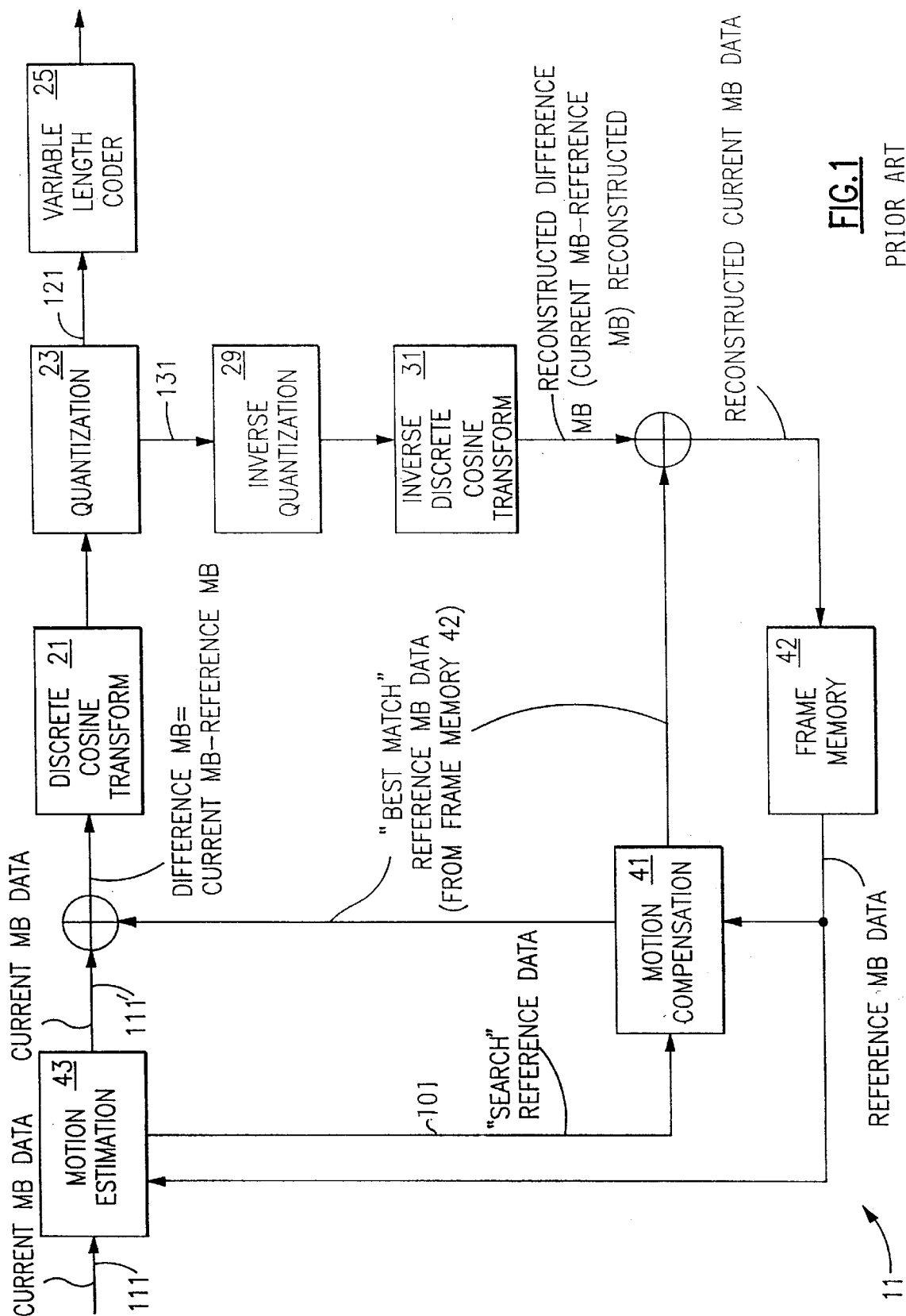

For purposes of illustration, a generalized flow chart of MPEG compliant encoding is shown in FIG. 1. In the flow chart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111' of a subsequent picture goes to the Motion Estimation unit 43 of the encoder. Motion vectors 101 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 43.

Figure 2:
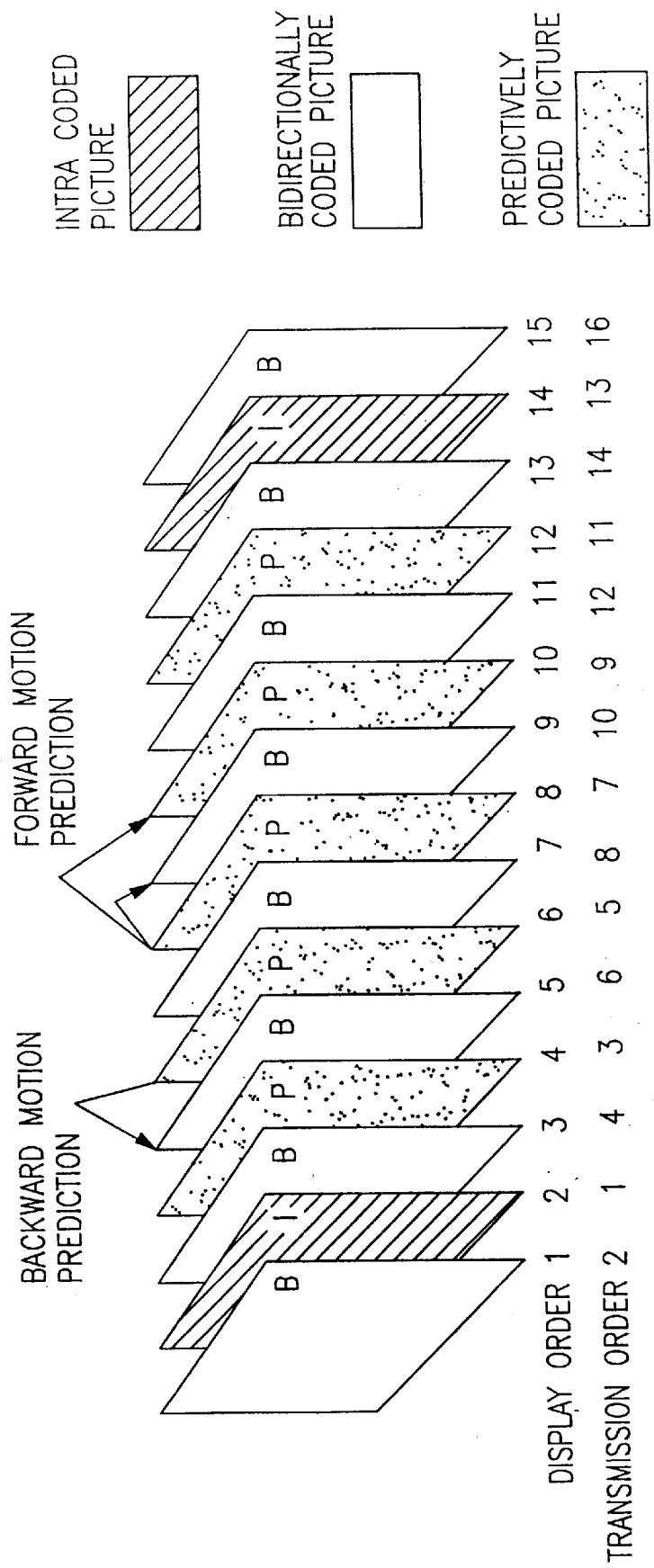
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
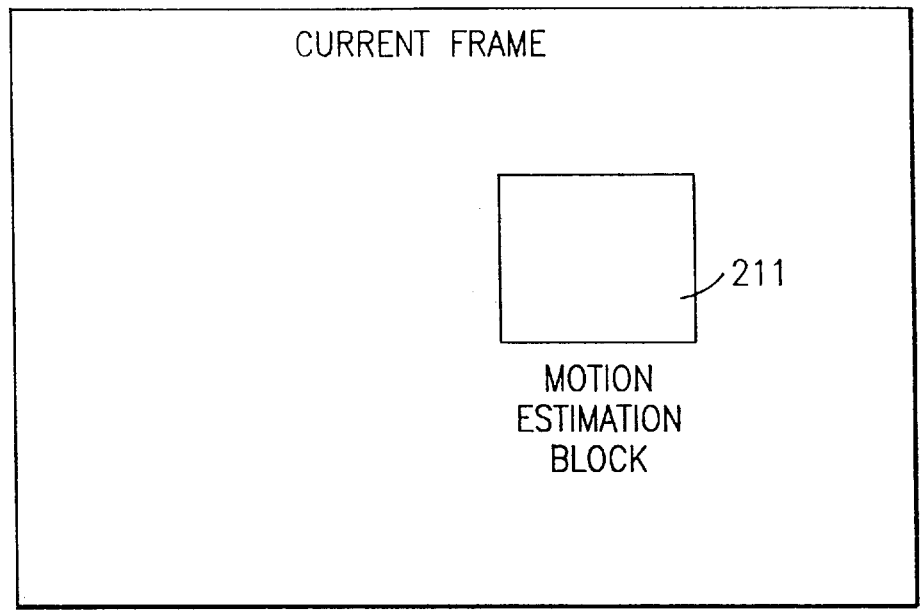
FIGS. 3a and 3b illustrate the search from the motion estimation block in the current frame or picture to the best matching block in subsequent or previous frame or picture. Elements 211 and 211' represent the same location in both search windows.
Figure 3:
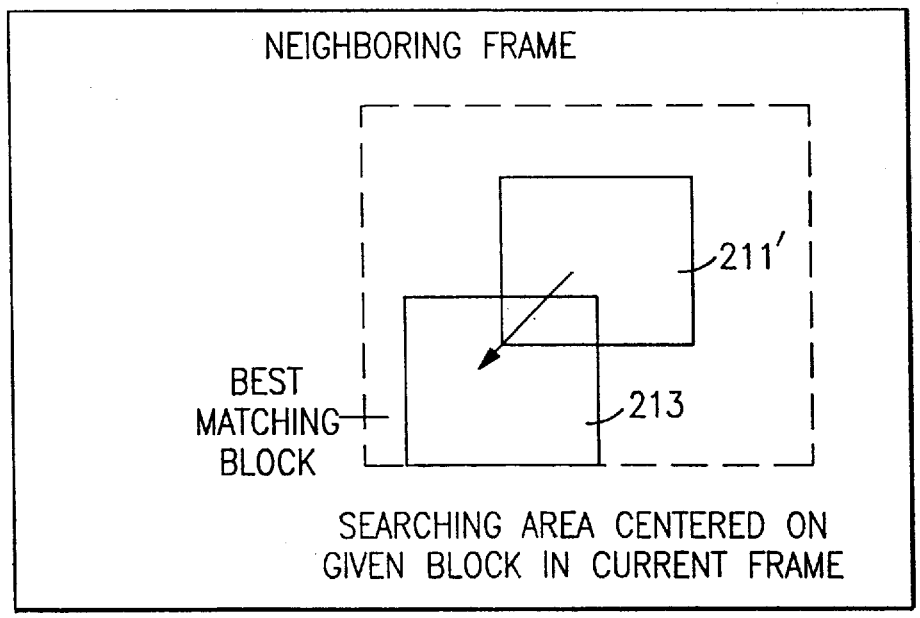
Figure 4:
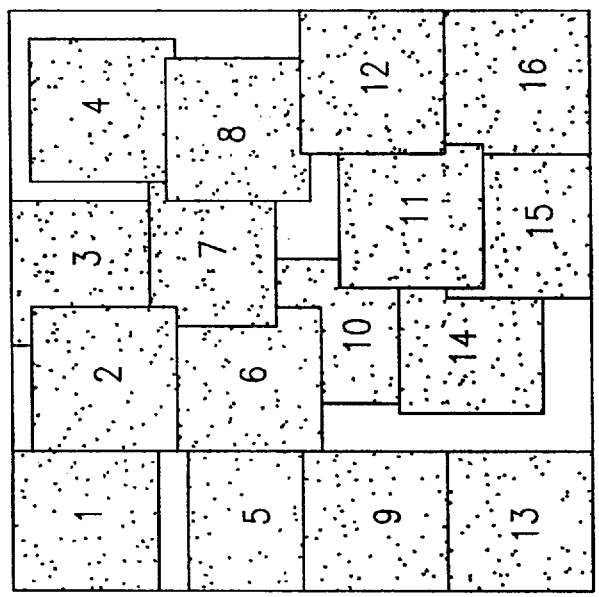
FIGS. 4a and 4b illustrates the movement of blocks in accordance with the motion vectors from their position in a previous picture to a new picture, and the previous picture's blocks adjusted after using motion vectors.

One method by which motion estimation is carried out, shown in FIGS. 3a and 3b, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIGS. 4a and 4b. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIGS. 3a and 3b, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the. y direction and how many pixels in the x direction is the best match displaced in the next picture. Also encoded is difference data, also referred to as the "prediction error", which is the difference in chrominance and luminance between the current macroblock and the best match reference macroblock.

The number of bits needed to represent any one picture is directly related to the content and the complexity of that picture. Thus, each individual picture may have a different number of bits. The process of bit rate control is used to regulate and maintain the bit rate to the encoder approximately constant. There are three main functions for bit rate control:
(1) Picture bit allocation.
(2) Macroblock rate control.
(3) Macroblock adaptive quantization.

Picture bit allocation depends on picture complexity, the requirement to maintain a relatively constant bit rate, and the requirement to observe rate control buffer limits. Macroblock rate control regulates the produced bits to match allocations. Macroblock adaptive quantization produces uniform distortion.

The requirement to produce uniformity in a picture means that the quantization varies smoothly from macroblock to macroblock. In a sequence of pictures within a single view, the pictures change slightly from one picture to the next picture. Thus, within a scene the average quantization value of a picture is a good starting quantization value for the next picture.

However, where there is a scene change the average quantization may, and frequently does, change abruptly from one picture in a sequence to the next picture in the sequence. Thus, a need exists for scene change detection to determine if two adjacent pictures are of similarity or are of large differences.

The scene change can be of, for example, Luminance difference between frames, or Chrominance difference between frames.

The contrast or difference measurement is determined by $$C = \Sigma |P(j) - P(j+1)|$$

where C is the contrast, P(j) is the luminance or chrominance of the $j^{th}$ pixel, j is the pixel location in the picture and the summation is taken over the entire picture.

A large C value indicates higher differences between pixels within the pictures, that is, higher picture complexity. The encoder process can be adjusted according to the complexity of the picture.

In the case of field based coding, the calculation of contrast is divided into odd and even luminance and chrominance. These field based values for C are used to adjust the quantization on a field picture boundary. For this purpose the calculation of C is performed on pixels of the same parity field. That is, $$C_{lum,odd} = \Sigma |P(j) - P(j+1)|$$

where P(j) and P(j+1) are luminance pixels of the odd field, and $$C_{lum,even.} = \Sigma |P(k) - P(k+1)|$$

where P(k) and P(k+1) are luminance pixels of the even field.

Similarly, $$C_{chr,odd} = \Sigma |P(j) - P(j+1)|$$

where P(j) and P(j+1) are chrominance pixels of the odd field, and $$C_{chr,even} = \Sigma |P(k) - P(k+1)|$$

where P(k) and P(k+1) are chrominance pixels of the even field.

Furthermore, the calculation of C for chrominance data should be done independently for the Cb and Cr components of color. This leads to the following method for determining values of contrast for the chrominance picture data, $$C_{chr,odd,Cb} = \Sigma |P(j) - P(j+1)|$$

where P(j) and P(j+1) are horizontally adjacent Cb pixel components of the odd field. The same can be done for Cr, $$C_{chr,odd,Cr} = \Sigma |P(j) \ P(j+1)|,$$

and for the even field, $$C_{chr,even,Cb} = \Sigma |P(j) - P(j+1)|,$$

$$C_{chr,even,Cr} = \Sigma |P(j) - p(j+1)|.$$

Including the chrominance components in the contrast operations enables the encoder to detect changes in which the luminance component remains constant, but the chrominance is changing. This results in a much more accurate starting quantization for the next picture.

When the encoder processes a picture the quantization is adjusted according to $$M(i+1) = [C(i+1)/C(i)]M(i),$$

where M(i) is average quantization of the $i^{th}$ picture.

A large value of C indicates more complexity and details in the picture. A smaller value of C indicates less complexity and details in the picture and a smaller quantization value. When the encoder goes from a picture of small C to the next picture of larger C, a relatively larger quantization is needed to maintain a relatively equal number of bits produced in each picture. The ratio

[C(i+1)/C(i)]

allows the amount of changes needed to be based on picture contrast. This adjustment, at the start of the picture, allows a better and faster control in the required adaptive quantization and bit regulation during coding. In IPB (Intra-Predicted-Bidirectional) coding, a large picture contrast can be used by the encoder to force an I (Intra) picture.

While the invention has been described with respect to certain preferred embodiments and exemplifications, it is not intended to limit the scope of the invention thereby, but solely by the claims appended hereto.

We claim:

1. In a method of encoding a digital video bitstream in a digital video encoder to produce a compressed digital a video bitstream, said method comprising:
   a) performing intra-picture video compression comprising the steps of:
      a1) discrete cosine transforming a digital image of pixels in a macroblock of a picture to convert the picture from a time domain digital image of the pixels in the macroblock of the picture to a frequency domain image of the pixels in the macroblock;
      a2) quantizing the frequency domain image of the pixels in the macroblock;
      a3) run length coding the quantized frequency domain image of the pixels in the macroblock; and
      a4) Huffman coding the run length coded frequency domain image of the pixels in the macroblock; and
   b) performing inter-picture compression between a current intra-picture compressed picture and a reference intra-picture compressed picture comprising the steps of:
      b1) inverse quantizing macroblocks of the current picture;
      b2) inverse discrete cosine transforming inverse quantized macroblocks of the current picture;
      b3) searching from a macroblock in the reference picture to the current picture for a nearby macroblock in the current picture with same content to the macroblock in the reference picture;
      b4) extracting a chrominance and a luminance difference and a vector between pixels in the current picture macroblock and the reference picture macroblock; and
      b5) compressing the chrominance and the luminance difference and the vector between pixels in the current picture macroblock and the reference picture macroblock for transmission;

the improvement comprising determining a difference in complexity between the current picture and the reference picture and adjusting the quantization therebetween in response to the difference in complexity wherein the difference in complexity is determined by:

1) determining the chrominance or luminance, P(j), of individual pixels, where P(j) is the luminance or chrominance of a $j^{th}$ pixel;

2) calculating a contrast function that is the sum over the pixels in a picture of the contrast difference between sets of adjacent pixels, given by $$C=\Sigma|P(j)-P(j+1)|,$$

where C=Contrast, where large value of C indicates more complexity and details in the picture then a small value of C;

3) calculating therefrom a quantization adjustment $$M(i+1)=\{C(i+1)/C(i)\}M(i),$$

where M(i) is the average quantization factor used to quantize discrete cosine transformation coefficients of the $i^{th}$ picture; and 4) adjusting the quantization or picture type responsive to the ratio of the average quantization factors, so that when encoding goes from a picture of small C to a next picture of larger C, a relatively larger quantization is provided to maintain a relatively equal number of bits produced in each picture.

2. The method of claim 1 comprising forcing an Intra picture responsive to a high contrast.

3. The method of claim 1 wherein coding is field based, and wherein the j and j+1 pixels are of the same parity field.

* * * * *